(12) United States Patent
Kang et al.

(10) Patent No.: US 12,726,030 B2
(45) Date of Patent: Sep. 1, 2026

(54) GRID-FORMING POWER CONVERSION CONTROL DEVICE AND METHOD

(71) Applicants: PION ELECTRIC CO., LTD., Seoul (KR); INDUSTRY-ACADEMIC COOPERATION FOUNDATION, YONSEI UNIVERSITY, Seoul (KR)

(72) Inventors: Ji Seong Kang, Incheon (KR); Kyeon Hur, Seoul (KR)

(73) Assignees: PION ELECTRIC CO., LTD., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 18/843,589

(22) PCT Filed: Mar. 25, 2022

(86) PCT No.: PCT/KR2022/004247

§ 371 (c)(1),
(2) Date: Oct. 17, 2024

(87) PCT Pub. No.: WO2023/167363

PCT Pub. Date: Sep. 7, 2023

(65) Prior Publication Data

US 2025/0175004 A1 May 29, 2025

(30) Foreign Application Priority Data

Mar. 2, 2022 (KR) ........................ 10-2022-0026716

(51) Int. Cl.
*H02J 3/38* (2006.01)

(52) U.S. Cl.
CPC ............. *H02J 3/38* (2013.01); *H02J 2300/20* (2020.01)

(58) Field of Classification Search
CPC ................................ H02J 3/38; H02J 2300/20
See application file for complete search history.

(56) References Cited

U.S. PATENT DOCUMENTS

2016/0372926 A1* 12/2016 Pahlevaninezhad .... H02J 3/381
2021/0288592 A1* 9/2021 Kouno .................. G01R 23/15

FOREIGN PATENT DOCUMENTS

EP 3654483 A1 * 5/2020 ........ H02M 7/53871
KR 10-2014-0095119 A 8/2014
KR 10-2016-0099914 8/2016

(Continued)

OTHER PUBLICATIONS

Kang, Jiseong et al., "Simulation and Comparison of Frequency Control Schemes for Grid-Forming Inverters", Proceedings of the KIEE Conference, 2021, vol. 2021, No. 4, pp. 49-50.

(Continued)

*Primary Examiner* — Robert L Deberadinis
(74) *Attorney, Agent, or Firm* — Bridgeway IP Law Group, PLLC; Jihun Kim

(57) ABSTRACT

The present technology relates to a grid-forming power conversion control technology and, more specifically, to a grid-forming power conversion control device and a grid-forming power conversion control method. According to an embodiment, the output frequency of a grid-forming power conversion device can be controlled without a complicated current controller, which enables a simple structure and a high control speed.

6 Claims, 7 Drawing Sheets

(56) References Cited

FOREIGN PATENT DOCUMENTS

| | | | |
|---|---|---|---|
| KR | 10-2019-0026379 | A | 3/2019 |
| KR | 10-2020-0022954 | A | 3/2020 |
| KR | 10-2020-0079606 | A | 7/2020 |
| KR | 10-2020-0108553 | | 9/2020 |

OTHER PUBLICATIONS

Kang, Jiseong et al., "Shaping the transient performance of droop-controlled grid forming converters for frequency regulation", 2021 IEEE 12th Energy Conversion Congress & Exposition—Asia. 2021, pp. 1777-1782.

* cited by examiner

GRID-FORMING POWER CONVERSION CONTROL DEVICE AND METHOD

TECHNICAL FIELD

The present technique relates to a grid-forming power conversion control technique, and more specifically, to a grid-forming power conversion control device and a power conversion control method.

BACKGROUND ART

The future of world energy systems depends on development of new energy technologies according to limitation of fossil fuels and how to solve emission of greenhouse gas (GHG) generated from the fossil fuels. In addition, the trend of future energy is expected to be changed from the oil era to the new and renewable energy era based on hydrogen by way of a natural gas era.

Renewable energy may be divided into various types, such as solar energy, solar power generation, wind power generation, micro-hydro power generation, waste incineration heat and power generation, biomass energy (biogas, gasification power generation, biofuel), geothermal energy, marine energy, and the like according to the technology thereof and the form of final energy. The renewable energy is almost infinite as it obtains clean energy using natural energy sources of the sun (light, heat), wind, water, and the sea as primary energy sources.

Although investments are focused on expansion and distribution of new and renewable energy such as wind and solar power generation around the world, power generation from the new and renewable energy sources such as wind and solar power having the characteristic of intermittent power generation is difficult to predict the output and has a significant impact on stable operation of interconnected grids due to the characteristic of severe output fluctuation.

Therefore, in order to dramatically expand distribution of new and renewable energy sources such as wind and solar power, stable generation and supply of output power, which has severe output fluctuations, and improvement of power quality are urgently required.

The background art of the present invention is disclosed in Korea Laid-opened Patent No. 2016-0099914.

DISCLOSURE OF INVENTION

Technical Problem

The present invention provides a grid-forming power conversion control device and a method thereof, which can operate at a high speed while controlling the frequency of the voltage output by a grid-forming power conversion control device without controlling the DC current.

Technical Solution

According to one aspect of the present invention, there is provided a grid-forming power conversion control device.

The grid-forming power conversion control device according to an aspect of the present invention may comprise: a power conversion unit for converting power supplied from a new and renewable energy generator into a voltage suitable for supplying to a grid power source; and a frequency control unit for calculating a frequency output from the power conversion unit.

According to another aspect of the present invention, there is provided a grid-forming power conversion control method and a computer program executing the same.

The grid-forming power conversion control method according to an aspect of the present invention the computer program executing the same may comprise the steps of: converting power supplied from a new and renewable energy generator into a voltage suitable for supplying to a grid power source; and calculating an output frequency.

Advantageous Effects

According to an embodiment of the present invention, as the output frequency of the grid-forming power conversion control device can be controlled without a complicated current controller, the configuration is simple, and the control speed is fast.

BEST MODE FOR CARRYING OUT THE INVENTION

Figure 1:
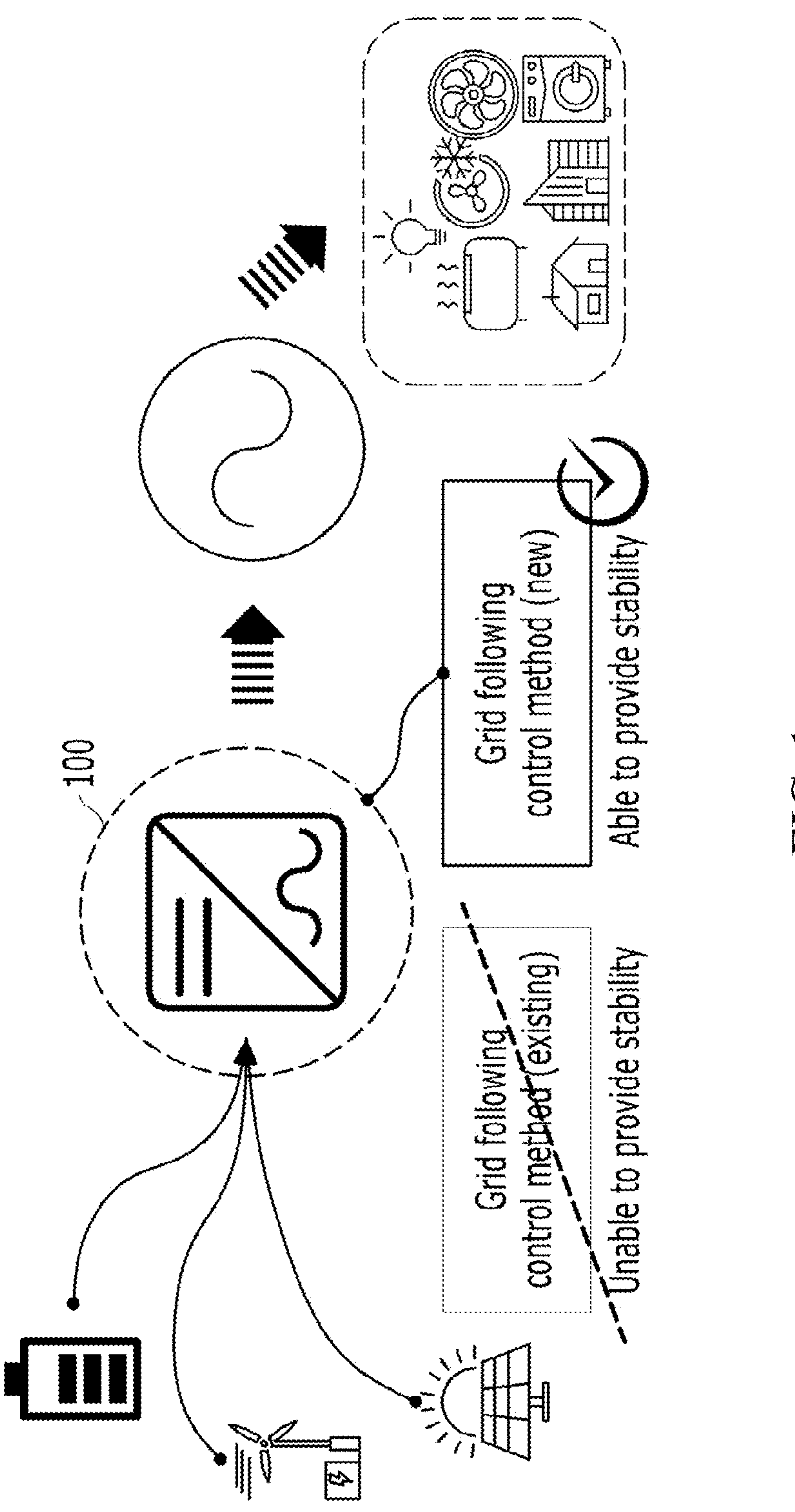
FIGS. 1 to 3 are views for explaining a grid-forming power conversion control device according to an embodiment of the present invention.

As the present invention may make various modifications and have various embodiments, specific embodiments are illustrated in the drawings and specifically described through detailed description. However, it should be understood that this is not intended to limit the present invention to specific embodiments, and includes all modifications, equivalents, and substitutes included in the spirit and technical scope of the present invention. In describing the present invention, when it is determined that the specific description of related known techniques may unnecessarily obscure the gist of the present invention, the detailed description will be omitted.

Hereinafter, preferred embodiments of the present invention will be described in detail with reference to the accompanying drawings, and in describing with reference to the accompanying drawings, the same or corresponding components are assigned with the same drawing numerals, and redundant descriptions thereof will be omitted.

Figure 2:
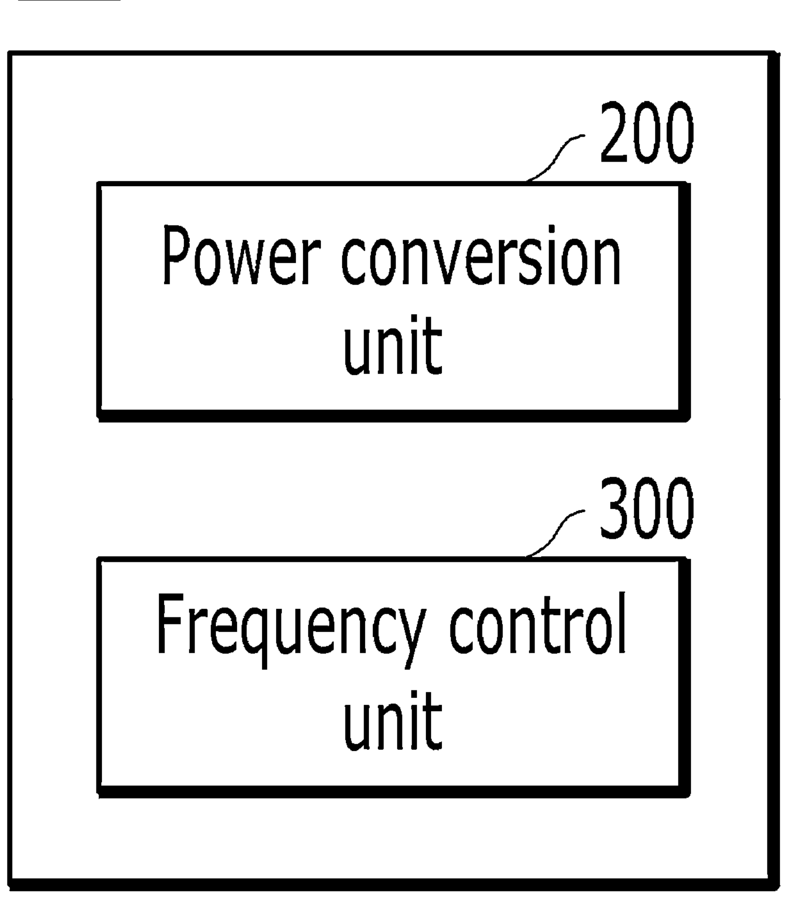
Figure 3:
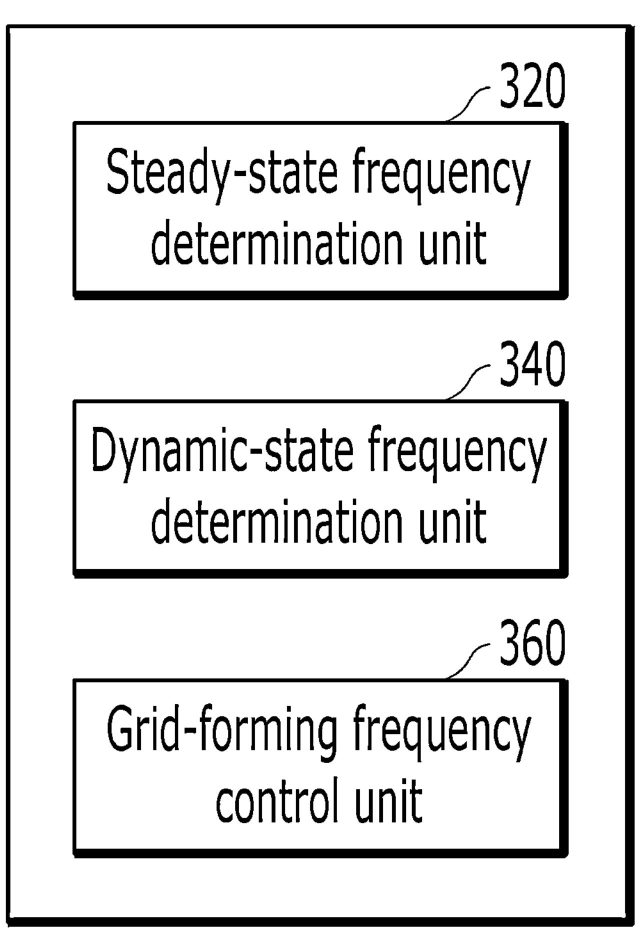

FIGS. 1 to 3 are views for explaining a grid-forming power conversion control device according to an embodiment of the present invention.

Referring to FIG. 1, a grid-forming power conversion control device 100 is installed between a new and renewable energy generator and a grid power source. The grid-forming power conversion control device 100 supplies power supplied from the new and renewable energy generator to the grid power source after converting the power into a voltage suitable for supplying to the grid power source.

The grid-forming power conversion control device 100 is a device that independently generates power in a power system and performs a function similar to a generator. The grid-forming power conversion control device 100 is required to be expanded since it can replace the role of a synchronous generator, which is decreasing as new and renewable power sources increase.

The grid-forming power conversion control device 100 should set a power sharing ratio between an external AC power generation system and a conventional power generation system to supply power to a load. To this end, the grid-forming power conversion control device 100 should control the magnitude and frequency of AC voltage to be converted and output.

In the case of the Droop or Virtual Synchronous Machine (VSM) control method among existing grid-forming power conversion control methods, the grid-forming power conversion control device 100 controls a power generation system by detecting power generated by the power generation system during a relatively long period of time of 20 msec or longer, and calculating low-frequency components that have passed through a filter.

However, the grid-forming power conversion control device 100 according to an embodiment of the present invention is a device that converts power using a semiconductor device, and it may operate at a higher speed compared to conventional control methods.

Meanwhile, in the matching control method among the existing grid-forming power conversion control methods, the frequency of output voltage is controlled by the magnitude of input DC voltage, and the output frequency of the grid-forming power conversion is stabilized only when stable DC voltage is provided. In addition, the matching control method should control the DC current using a separate control unit in order to stabilize the DC voltage provided for grid-forming power conversion.

However, the grid-forming power conversion control device 100 according to an embodiment of the present invention may control the frequency of output voltage without controlling the DC current, and operate at a speed higher than that of the existing methods.

Referring to FIG. 2, the grid-forming power conversion control device 100 includes a power conversion unit 200 and a frequency control unit 300.

The power conversion unit 200 converts power supplied from a new and renewable energy generator into a voltage suitable for supplying to the grid power source.

The frequency control unit 300 calculates the frequency output from the power conversion unit 200. More specifically, the frequency control unit 300 calculates a frequency corresponding to the DC voltage provided to the grid-forming power conversion control device 100, and outputs the calculated frequency. The frequency control unit 300 operates without controlling the provided DC current.

The frequency control unit 300 calculates the output frequency using a frequency calculated in the steady state of the droop control method and a frequency calculated in the dynamic state. More specifically, the frequency control unit 300 calculates the output frequency $f_{proposed}$ by adding the frequency determination value $f_{steady}$ of the steady state and the frequency determination value $f_{dyn}$ of the dynamic state as shown below in equation 1.

$$f_{proposed} = f_{steady} + f_{dyn} \quad \text{[Equation 1]}$$

Referring to FIG. 3, the frequency control unit 300 includes a steady-state frequency determination unit 310, a dynamic-state frequency determination unit 320, and a grid-forming frequency control unit 330.

The steady-state frequency determination unit 310 calculates a steady-state frequency determination value. The steady-state frequency determination unit 310 may calculate the steady-state frequency determination value as shown below in equation 2.

$$f_{steady} = -m_p\left\{\left(\frac{\omega_{c1}}{s+\omega_{c1}}\right)p_{gmf} - p^*_{GFM}\right\} + f_0 \quad \text{[Equation 2]}$$

Here, $m_p$ denotes the droop rate, $\omega_{c1}$ denotes the cut-off frequency, s denotes the frequency domain of the low pass filter, $p_{gfm}$ denotes the measured instantaneous power value of the grid-forming source, $P^*_{GFM}$ denotes the power setting reference value of the grid-forming source, and $f_0$ denotes the rated frequency.

The steady-state frequency determination unit 310 may generate a steady-state frequency determination value $f_{steady}$ by measuring the root mean square (rms) power P. Generally, the steady-state frequency determination unit 310 may require a frequency control operation time of 50 ms (0.05 seconds) or more in the calculation process described above due to the filter. Since the steady-state frequency determination unit 310 shows the effect of frequency control after about 150 to 200 ms (0.15 to 0.2 seconds), which is about 3 to 4 times longer than the operation time, as a result, it may be difficult to expect a fast frequency control effect with only the steady-state frequency determination value $f_{steady}$, which is the same as that of the existing droop control method.

The dynamic-state frequency determination unit 320 calculates a dynamic-state frequency determination value. The dynamic-state frequency determination unit 320 may calculate the dynamic-state frequency determination value $f_{dyn}$ as shown below in equation 3.

$$f_{dyn} := \begin{cases} -a_{dyn}\left\{e^{b_{dyn}(V_{DC}-c_{dyn})} - 1\right\} & \text{if } V_{DC} \le c_{dyn} \\ a_{dyn}\left\{e^{b_{dyn}(V_{DC}-c_{dyn})} - 1\right\} & \text{if } V_{DC} \le c_{dyn} \end{cases} \quad \text{[Equation 3]}$$

Here, $a_{dyn}$, $b_{dyn}$, and $c_{dyn}$ denote arbitrary real number values representing the grid-forming frequency control effect.

At this point, the frequency determination value $f_{dyn}$ of the dynamic state, where $a_{dyn}$ is represented as $f_{dmax1}$ and $f_{dmax2}$, $b_{dyn}$ is represented as $k_p$, and $c_{dyn}$ is represented as $v_0$, may be expressed as shown below in equation 4.

$$f_{dyn} = \begin{cases} -f_{dmax1}\left\{e^{k_p(V_{DC}-v_0)} - 1\right\} & \text{if } V_{DC} \le v_0 \\ f_{dmax2}\left\{e^{k_p(V_{DC}-v_0)} - 1\right\} & \text{if } V_{DC} \le v_0 \end{cases} \quad \text{[Equation 4]}$$

Here, $f_{dmax1}$ and $f_{dmax2}$ denote parameters that limit the maximum and minimum values of the frequency determination value $f_{dyn}$ of the dynamic state, $k_p$ denotes the characteristic of the function curve, $V_{DC}$ denotes the provided DC voltage instantaneous value, and $v_0$ denotes DC rated voltage.

Here, $f_{dmax1}$ may be either a positive value or a negative value, and may be expressed as a graph that is convex upward when positive, and convex downward when negative. That is, when $f_{dmax1}$ is positive, it may increase the output frequency when the DC voltage $V_{DC}$ is lower than a set value $v_0$ to contribute to transfer of more power to the AC system, and when $f_{dmax1}$ is negative, it may decrease the output frequency when the DC voltage $V_{DC}$ is lower than the set value $v_0$ to contribute to stabilization of the DC voltage.

Here, $f_{dmax2}$ may also be a positive value or a negative value, and may be expressed as a graph that is convex downward when positive, and upward when negative. That is, when $f_{dmax2}$ is positive, it may decrease the output frequency when the DC voltage $V_{DC}$ is higher than the set value $v_0$ to contributes to transfer of less power to the AC system, and when $f_{dmax2}$ is negative, it may increase the output frequency when the DC voltage $V_{DC}$ is higher than the set value $v_0$ to contribute to stabilization of the DC voltage.

Since $f_{dmax1}$ and $f_{dmax2}$ are parameters, of which the sign and magnitude are adjustable, two methods can be used according the need and preferences of a user. Since $f_{dmax1}$ and $f_{dmax2}$ have a number of cases when they are lower and higher than the set value, respectively, a total of four types of control may be selected by the user.

TABLE 1

| | | $f_{dmax1}$ | |
|---|---|---|---|
| | | + | − |
| $f_{dmax2}$ | + | Option1 | Option2 |
| | − | Option3 | Option4 |

The dynamic-state frequency determination unit 320 may generate the frequency determination value $f_{dyn}$ of the dynamic state by measuring a DC voltage instantaneous value. The dynamic-state frequency determination unit 320 may perform faster frequency control by using a filter having a short time constant. In addition, the dynamic-state frequency determination unit 320 may output 0 as the frequency determination value $f_{dyn}$ when the DC voltage is the same as the reference (rated voltage) ($V_{DC}=v_0$) so as not to change the frequency, increases or decreases the frequency when the DC voltage is lower than the reference (rated voltage) ($V_{DC}\leq v_0$), and increases or decreases the frequency when the DC voltage is higher than the reference (rated voltage) ($V_{DC}\geq v_0$). That is, the dynamic-state frequency determination unit 320 does not operate to generate the frequency determination value $f_{dyn}$ of the dynamic state in the steady state where the frequency and output are stabilized. However, since the dynamic-state frequency determination unit 320 may increase or decrease the frequency without going out of the stability limit in a low voltage section and may also increase or decrease the frequency without going out of the stability limit in a high voltage section according to the signs of $f_{dmax1}$ and $f_{dmax2}$, it is possible to recognize the fact that the DC voltage has deviated from the rated voltage and reflect it in correction of the output frequency according to the condition of the system. The grid-forming frequency control unit 330 calculates the output frequency $f_{proposed}$ by adding the frequency determination value $f_{steady}$ of the steady state and the frequency determination value $f_{dyn}$ of the dynamic state as shown in equation 1 described above. The grid-forming frequency control unit 330 may exhibit a fast and accurate effect on frequency control in the dynamic state without harming the load sharing in the steady state by using the frequency determination value $f_{dyn}$ of the dynamic state.

FIGS. 4 to 7 are views for explaining a grid-forming power conversion control method according to an embodiment of the present invention.

Figure 4:
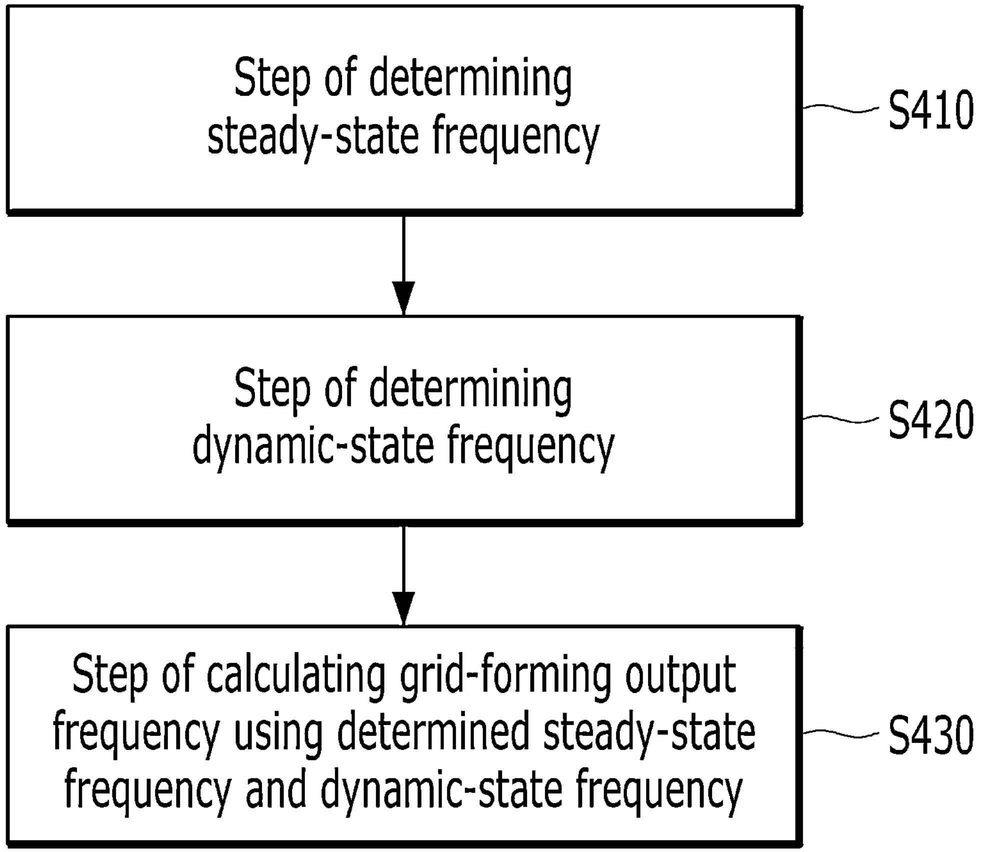
FIGS. 4 to 7 are views for explaining a grid-forming power conversion control method according to an embodiment of the present invention.

Referring to FIG. 4, at step S410, the grid-forming power conversion control device 100 according to the present invention determines a steady-state frequency. The grid-forming power conversion control device 100 may calculate a steady-state frequency determination value as shown in equation 2 described above. As described above, the grid-forming power conversion control device 100 may calculate a steady-state frequency determination value $f_{steady}$ through the root mean square (rms) method.

At step S420, the grid-forming power conversion control device 100 determines a dynamic-state frequency. The grid-forming power conversion control device 100 may calculate a frequency determination value $f_{dyn}$ of the dynamic state as shown in equation 3 and equation 4 described above. The grid-forming power conversion control device 100 may calculate the frequency determination value $f_{dyn}$ of the dynamic state by measuring a DC voltage instantaneous value. The grid-forming power conversion control device 100 may perform faster frequency control by using a filter having a short time constant, and as described above, may output 0 as the frequency determination value $f_{dyn}$ when the DC voltage is the same as the reference (rated voltage) ($V_{DC}=v_0$) so as not to change the frequency, increases or decreases the frequency when the DC voltage is lower than the reference (rated voltage) ($V_{DC}\leq v_0$), and increases or decreases the frequency when the DC voltage is higher than the reference (rated voltage) ($V_{DC}\geq v_0$), so that it may not operate to generate the frequency determination value $f_{dyn}$ of the dynamic state in the steady state where the frequency and output are stabilized, and reflect it in correction of the output frequency according to the condition of the system.

At step S430, the grid-forming power conversion control device 100 calculates a grid-forming output frequency using the determined steady-state frequency and dynamic-state frequency.

Hereinafter, performance of the output frequency control of the grid-forming power conversion control device 100 according to the present invention will be described with reference to FIGS. 5 to 7.

Figure 5:
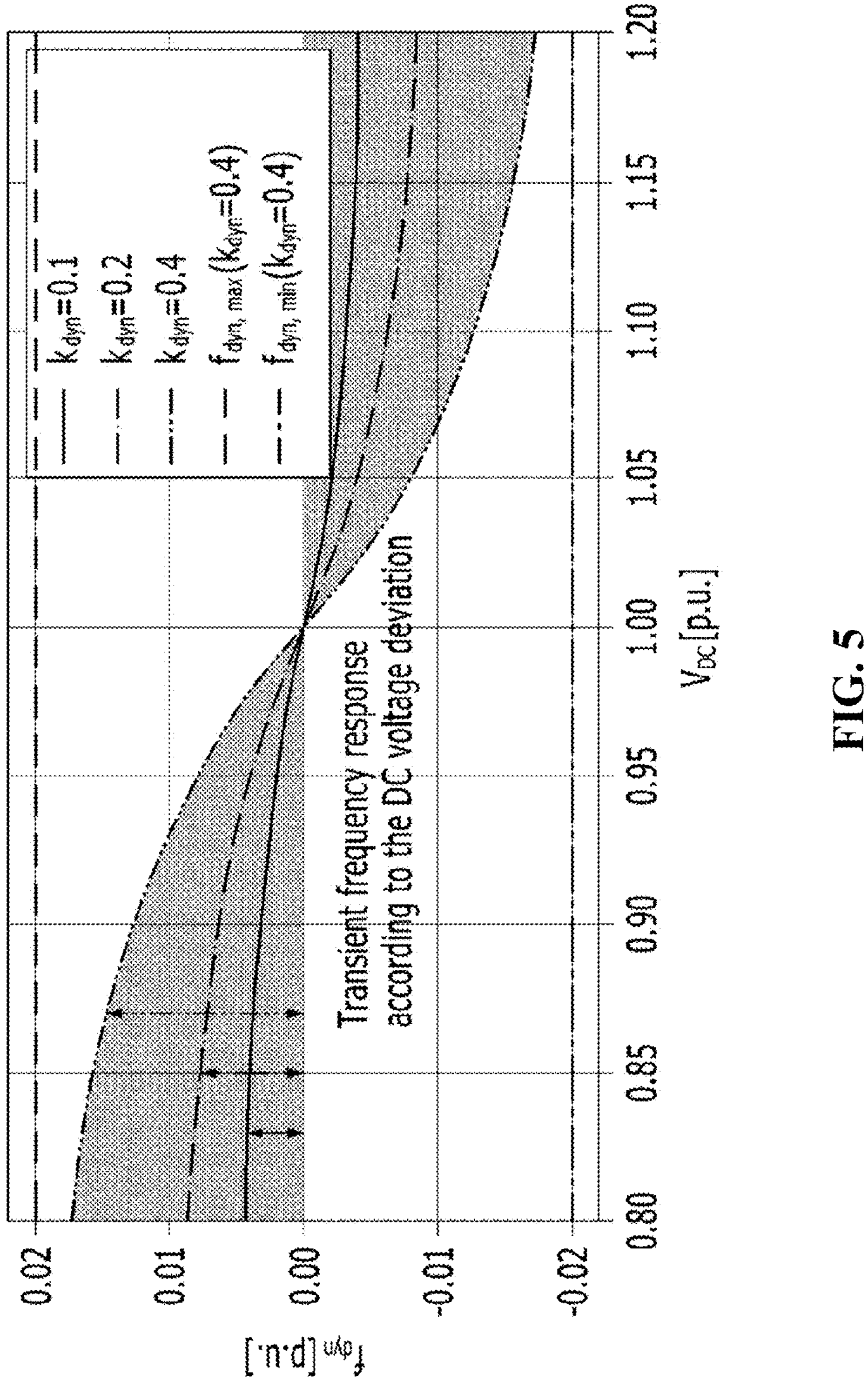

Referring to FIG. 5, a dynamic-state frequency according to an embodiment of the present invention may be shown in correspondence to DC voltage. The gray area in FIG. 5 shows a dynamic-state frequency that changes correspondingly when the DC voltage deviates from the rated voltage.

$$F_{dmax} = k_{dny} * m_p \qquad \text{[Equation 5]}$$

Here, $m_p$ denotes the droop rate that comes from the $f_{steady}$, and $m_p$ may be the maximum fluctuation range of the grid-forming steady-state frequency output.

$k_{dyn}$ is a coefficient that shows how strongly $f_{dyn}$ affects compared to $f_{steady}$. It is a parameter that determines the magnitude of $f_{dmax}$ regardless of the sign of $f_{dmax}$, and when the value is large without regard to the sign, the control effect appears to be stronger, and as the value approaches 0, the overall effect of $f_{dyn}$ may be lowered.

For example, when $k_{dyn}$ is set to 0.4, it may mean that $f_{dyn}$ has an effect of control 40% as strong as $f_{steady}$, and when the maximum range of variation control of frequency of $f_{steady}$ is 100%, the effect of control of $f_{dyn}$ may be 40%.

Figure 6:
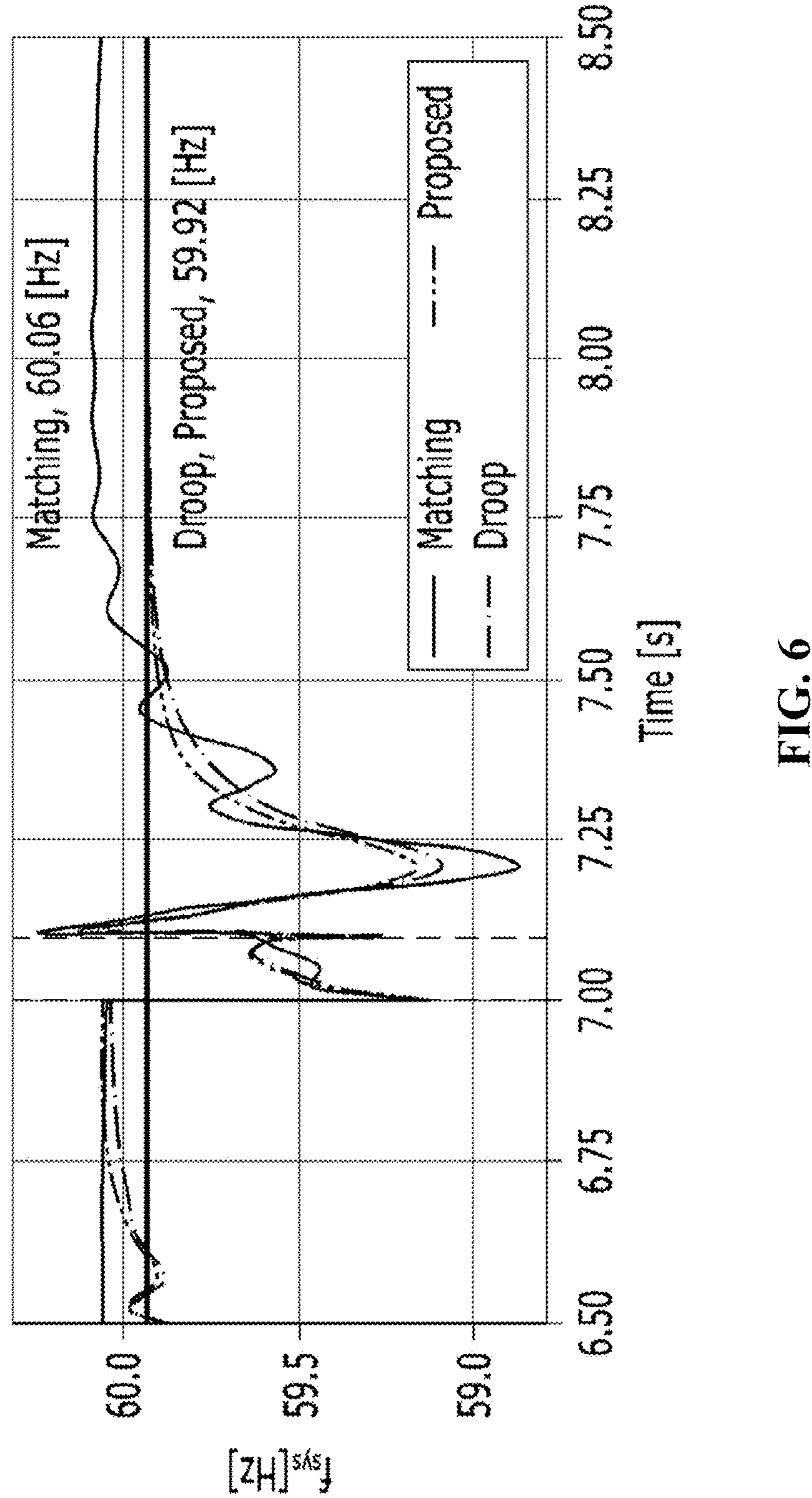

Referring to FIG. 6, compared to the matching control method and the droop control method of existing frequency control methods, it can be confirmed that the grid-forming power conversion control device 100 according to an embodiment of the present invention exhibits more stable frequency control performance and inertia effect by controlling the frequency not to drop below 59.0 Hz in a dynamic state where the energy of the system is insufficient as a generator is disconnected due to occurrence of a failure.

Figure 7:
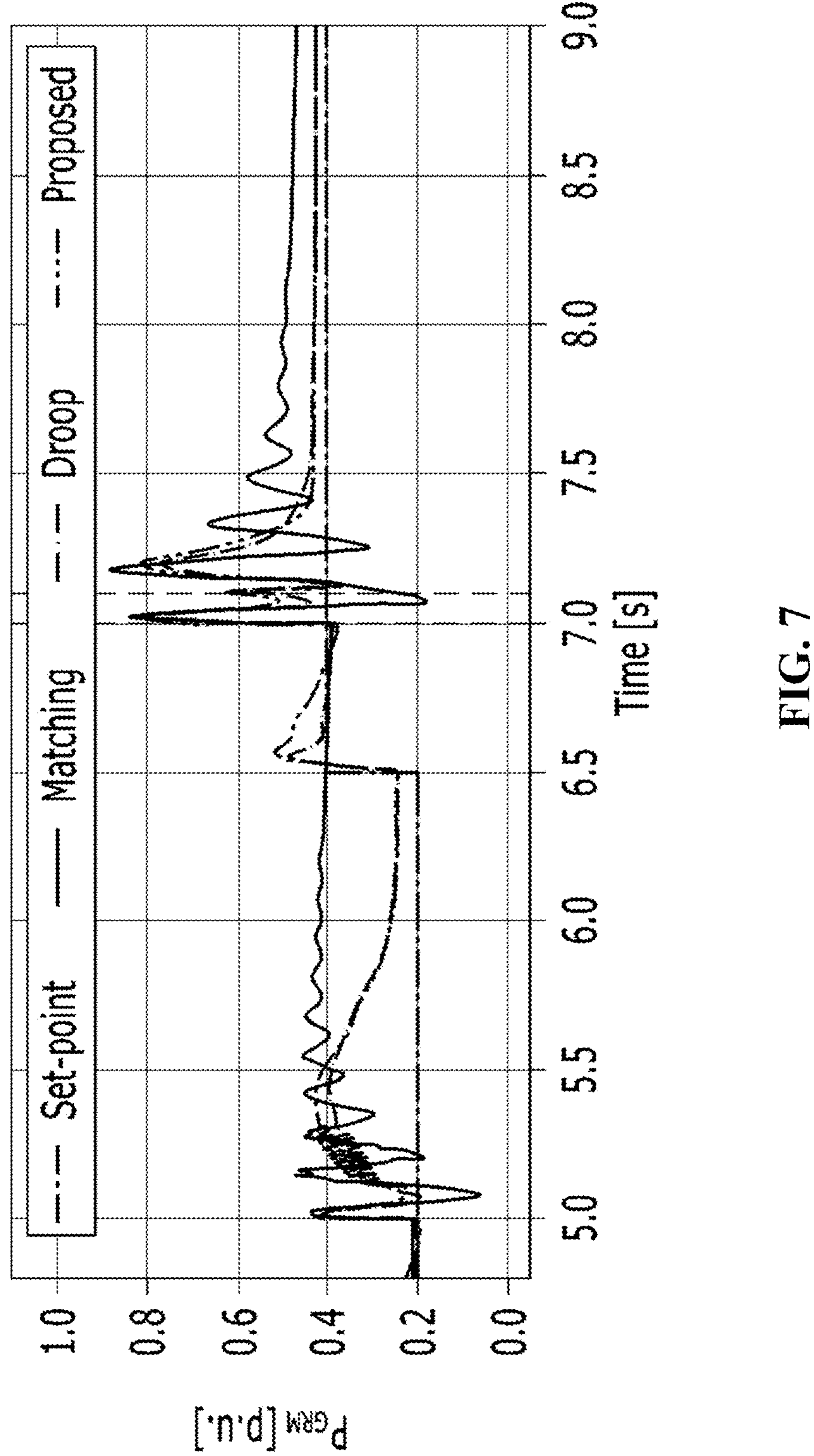

In addition, referring to FIG. 7, it can be confirmed that in a steady state where the set-point is changed, the grid-forming power conversion control device 100 according to an embodiment of the present invention outputs $p_{GFM}$ more similar to the set-point than that of the existing matching method, and it is almost the same as the droop control method. That is, it can be confirmed that the grid-forming power conversion control device 100 according to an embodiment of the present invention is more effective compared to the existing control method when a desired load sharing is achieved from parallel operation.

As described above, although it is described that all the components constituting the embodiments of the present invention are combined as one or operate in combination, the present invention is not necessarily limited to the embodiments. That is, within the scope of the present invention, all the components may be selectively combined as one or more to operate.

Although the operations are shown in a particular order in the drawings, it should not be understood that the operations should be performed in a particular order or in a sequential order or a desired result can be obtained only when all operations shown in the drawings are performed. In a specific situation, multi-tasking and parallel processing may be advantageous. Furthermore, it should not be understood that separation of various components in the embodiments described above is necessarily required, and it should be understood that the program components and systems described above may be generally integrated together into a single software product or packaged into a plurality of software products.

The present invention has been described focusing on the embodiments thereof. Those skilled in the art will understand that the present invention may be implemented in a modified form without departing from the essential characteristics of the present invention. Therefore, the disclosed embodiments should be considered from an illustrative viewpoint, rather than a restrictive viewpoint. The scope of the present invention is shown in the claims, not the above description, and all differences within the scope equivalent thereto should be interpreted as being included in the present invention.

The mode for carrying out the invention has been described together with the best mode for carrying out the invention described above.

INDUSTRIAL APPLICABILITY

The present invention relates to a grid-forming power conversion control technique, and as distribution of new and renewable energy sources such as wind and solar power can be expanded dramatically by realizing stable generation and supply of output power, which has severe output fluctuations, and improvement of power quality, the present invention is industrially applicable.

The invention claimed is:

1. A grid-forming power conversion control device comprising:

a power conversion unit for converting power supplied from a new and renewable energy generator into an AC voltage suitable for supplying to a grid power source; and a controller implemented by one or more processors and a memory storing instructions and configured to control an output frequency of the AC voltage generated by the power conversion unit, wherein the controller is configured to:

determine a steady-state frequency determination value based on a droop rate and a low-pass filter applied to a difference between a measured instantaneous power value of a grid-forming source and a power setting reference value;

determine a dynamic-state frequency determination value based on a provided DC voltage instantaneous value using a piecewise-defined exponential function of a deviation of the provided DC voltage instantaneous value from a rated DC voltage; and calculate the output frequency by adding the steady-state frequency determination value and the dynamic-state frequency determination value and control the power conversion unit according to the output frequency.

2. The device according to claim 1, wherein the controller is configured to determine the steady-state frequency determination value using a low-pass filter having a cutoff frequency.

3. The device according to claim 1, wherein the controller is configured to determine the dynamic-state frequency determination value according to a piecewise-defined exponential function of (VDC−v0) that yields zero when VDC equals the rated DC voltage v0.

4. A grid-forming power conversion control method executed in a grid-forming power conversion control device, the method comprising steps of:

converting power supplied from a new and renewable energy generator into an AC voltage suitable for supplying to a grid power source;

determining a steady-state frequency determination value based on a droop rate and a low-pass filter applied to a difference between a measured instantaneous power value of a grid-forming source and a power setting reference value;

determining a dynamic-state frequency determination value based on a provided DC voltage instantaneous value using a piecewise-defined exponential function of a deviation of the provided DC voltage instantaneous value from a rated DC voltage; and calculating an output frequency by adding the steady-state frequency determination value and the dynamic-state frequency determination value, and controlling a power conversion unit according to the output frequency.

5. The method according to claim 4, wherein the determining the dynamic-state frequency determination value includes outputting zero when VDC equals the rated DC voltage, and increasing or decreasing the dynamic-state frequency determination value when VDC deviates from the rated DC voltage.

6. A non-transitory computer-readable storage medium storing instructions that, when executed by one or more processors of a grid-forming power conversion control device, cause the device to perform the method of claim 4.

* * * * *